United States Patent [19]

Juras

[11] Patent Number: 4,812,152
[45] Date of Patent: Mar. 14, 1989

[54] DEVICE AND PROCESS FOR HEATING A FLAT OBJECT MADE OF THERMOPLASTIC MATERIAL ALONG A PREDETERMINED ZONE

[75] Inventor: Karl-Heinz Juras, Mainz, Fed. Rep. of Germany

[73] Assignee: Schott Glaswerke, Fed. Rep. of Germany

[21] Appl. No.: 100,177

[22] Filed: Sep. 23, 1987

[30] Foreign Application Priority Data

Sep. 24, 1986 [DE] Fed. Rep. of Germany ....... 3632408

[51] Int. Cl.$^4$ .................. C03B 29/00; C03B 33/02
[52] U.S. Cl. .......................................... 65/120; 65/113;
65/271; 65/273; 65/274; 264/57; 264/64;
264/80; 425/160; 425/384
[58] Field of Search ...................... 65/63, 65, 104, 106,
65/120, 271, 272, 273, 274, 284; 264/57, 64, 80;
425/160, 384

[56] References Cited

U.S. PATENT DOCUMENTS

| | | | |
|---|---|---|---|
| 2,331,014 | 10/1943 | Brown | 65/271 |
| 2,666,277 | 1/1954 | Noble | 65/272 |
| 3,036,405 | 5/1962 | Dwinell et al. | 65/272 |
| 3,186,819 | 6/1965 | Thorington et al. | 65/272 |
| 3,874,867 | 4/1975 | Dichter | 65/271 |
| 4,618,355 | 10/1986 | Otto et al. | 65/271 |

FOREIGN PATENT DOCUMENTS 1142994 11/1958 Fed. Rep. of Germany.
14721 7/1956 German Democratic Rep..

Primary Examiner—Arthur Kellogg
Attorney, Agent, or Firm—Wegner & Bretschneider

[57] ABSTRACT

In a process for heating an object made of thermoplastic material along a predetermined zone, a ring of burners arranged in series is guided along the zone and heats this zone, the zone forming a closed path and approximately matching the outer contour of the object; in a device for implementing the process, series-arranged burner units circulate on a path covering the zone to be heated, the units being guided along a closed loop.

16 Claims, 4 Drawing Sheets

DEVICE AND PROCESS FOR HEATING A FLAT OBJECT MADE OF THERMOPLASTIC MATERIAL ALONG A PREDETERMINED ZONE

BACKGROUND OF THE INVENTION

The invention relates to a device and a process for heating an object made of thermoplastic material such as, for example, a glass or glass-ceramic plate, along a predetermined zone, for example, along the entire rim area of a glass plate.

For the heating of a glass plate on its rim area, e.g., in order to raise the edges of the glass plate, it was common practice heretofore to hold the plate over a rectangular ring of stationary burners until the rim area of the plate had reached a suitable temperature.

The purpose of the present invention is to provide a process and a device for heating an object made of thermoplastic material along an arbitrary zone quickly, exactly and above all homogeneously to a desired temperature.

The essential feature of the invention is that the burners are not arranged in a stationary manner relative to the object to be heated, but rather are arranged in series and moved over the zone to be heated. This arrangement results in a great deal of diversity with respect to the shape of the zone to be heated and the nature of the heating, i.e., homogeneous, without places with different temperatures.

BRIEF DESCRIPTION OF THE DRAWINGS

An exemplary embodiment of the invention is illustrated in the drawings, in which.

DETAILED DESCRIPTION OF THE INVENTION

Figure 1:
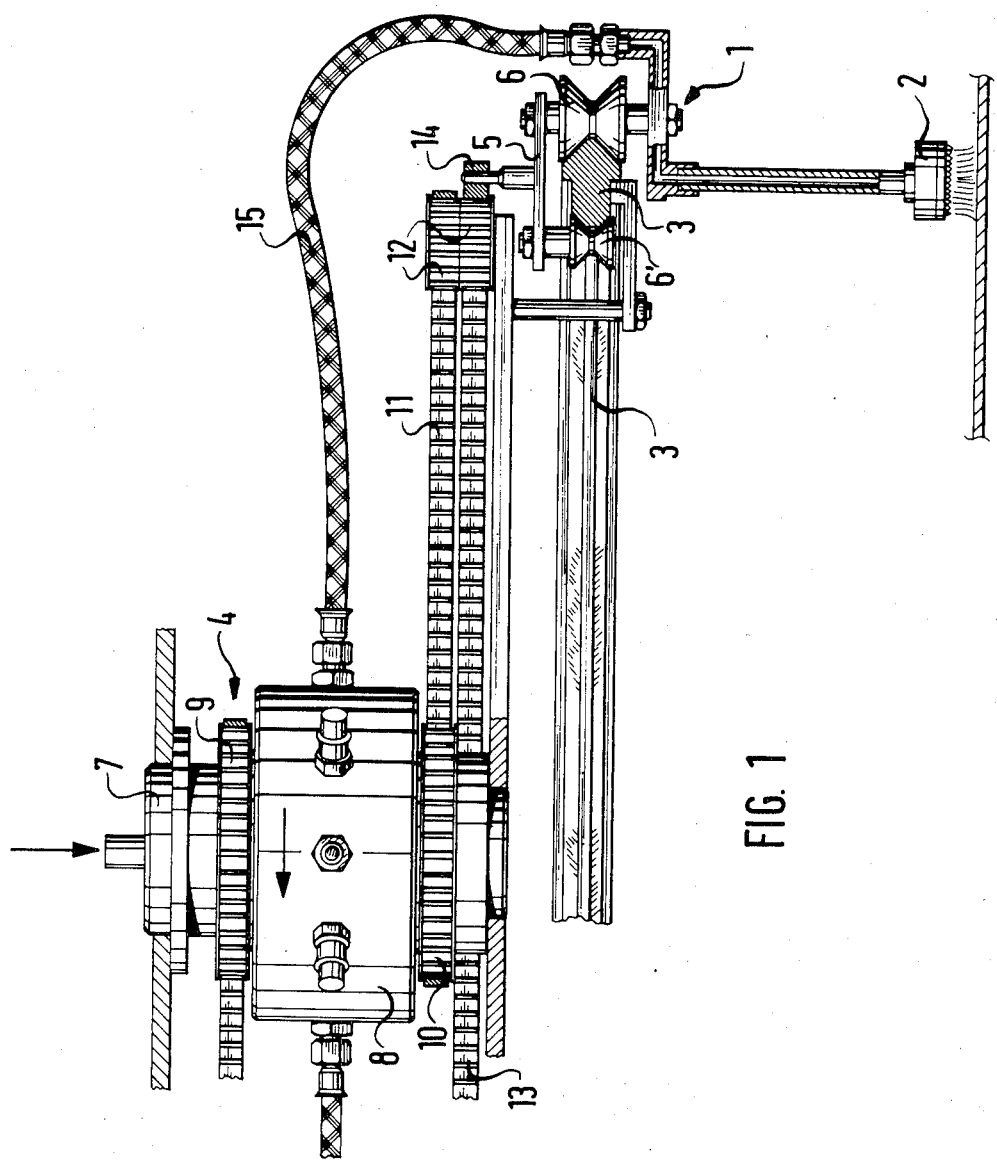
FIG. 1 shows a side section through a part of a preferred embodiment of the invention.
Figure 2:
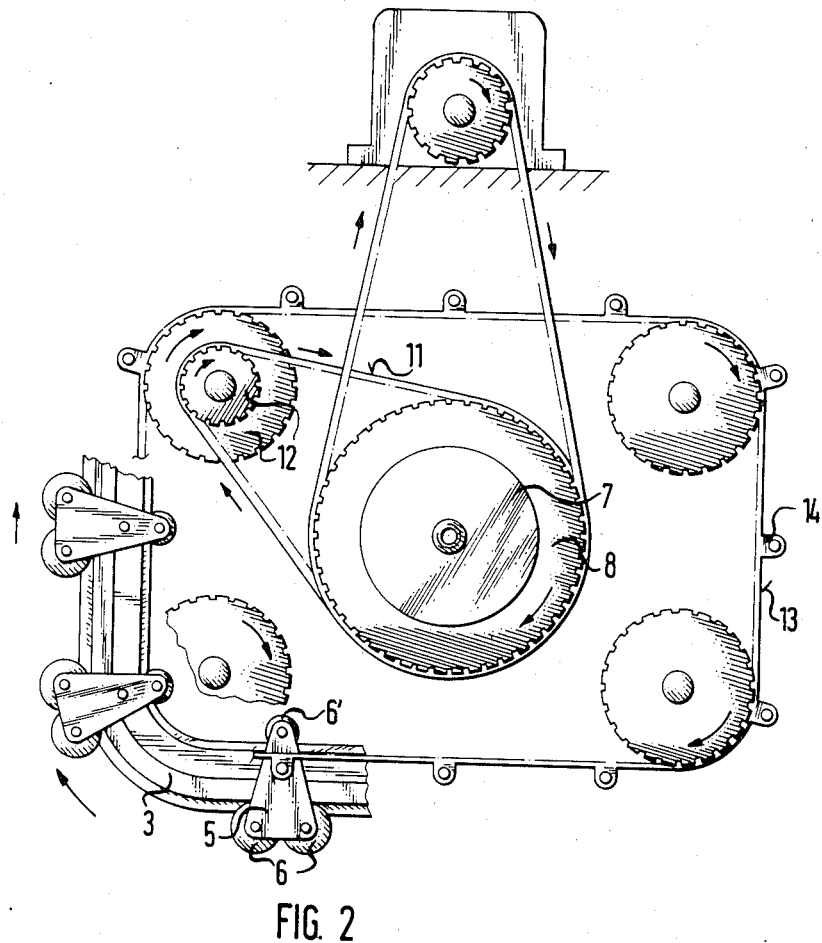
FIG. 2 shows a plan view of this embodiment.

As can be seen in FIG. 1 and 2, the device according to the invention consists of a plurality of burner units arranged in series, each of which units hangs from a carriage 5 which is guided along a rail loop 3 by means of rollers 6, 6'. The rail loop 3 approximately matches the contour of the zone to be heated, so that the burners 2, fastened to the burner units, are automatically guided along the zone to be heated. Several burners 2 can hang from one burner unit 1.

In the embodiment illustrated here, the carriage 5 of each burner unit has three rollers, two larger rollers 6 running on the outer edge of the rail loop 3 and a somewhat smaller roller 6' running on its inner edge.

The burner units 1 are supplied with fuel from a central fuel-distributor station 4.

This central fuel-distributor station 4 also contains the drive for the carriage 5 of the burner units 1. For this purpose, the fuel-distributor station 4 comprises a stator 7 on which runs a rotor 8. The rotor 8 is driven by a motor mounted outside the central fuel-distributor station 4 via a first gear 9 supported above the rotor.

In addition, the stator 7 bears below it a second gear 10 via which all the burner units 1 are synchronously driven.

For this purpose, a first toothed belt 11 which drives a drive wheel 12 runs over this first gear 10. On the same gear 12 there also runs a second toothed belt 13 which is equipped on its outside with drivers 14. By means of a cog (not illustrated) mounted on the top on the carriage 5 of burner unit 1, these drivers 14 move these burner units along the rail loop 3.

As already mentioned, the central fuel-distributor station supplies the burner units 1 with fuel. For this purpose, the rotor 8 forms a fuel-distributor chamber from which elastic hoses 15 lead to the burner units 1.

Figure 3:
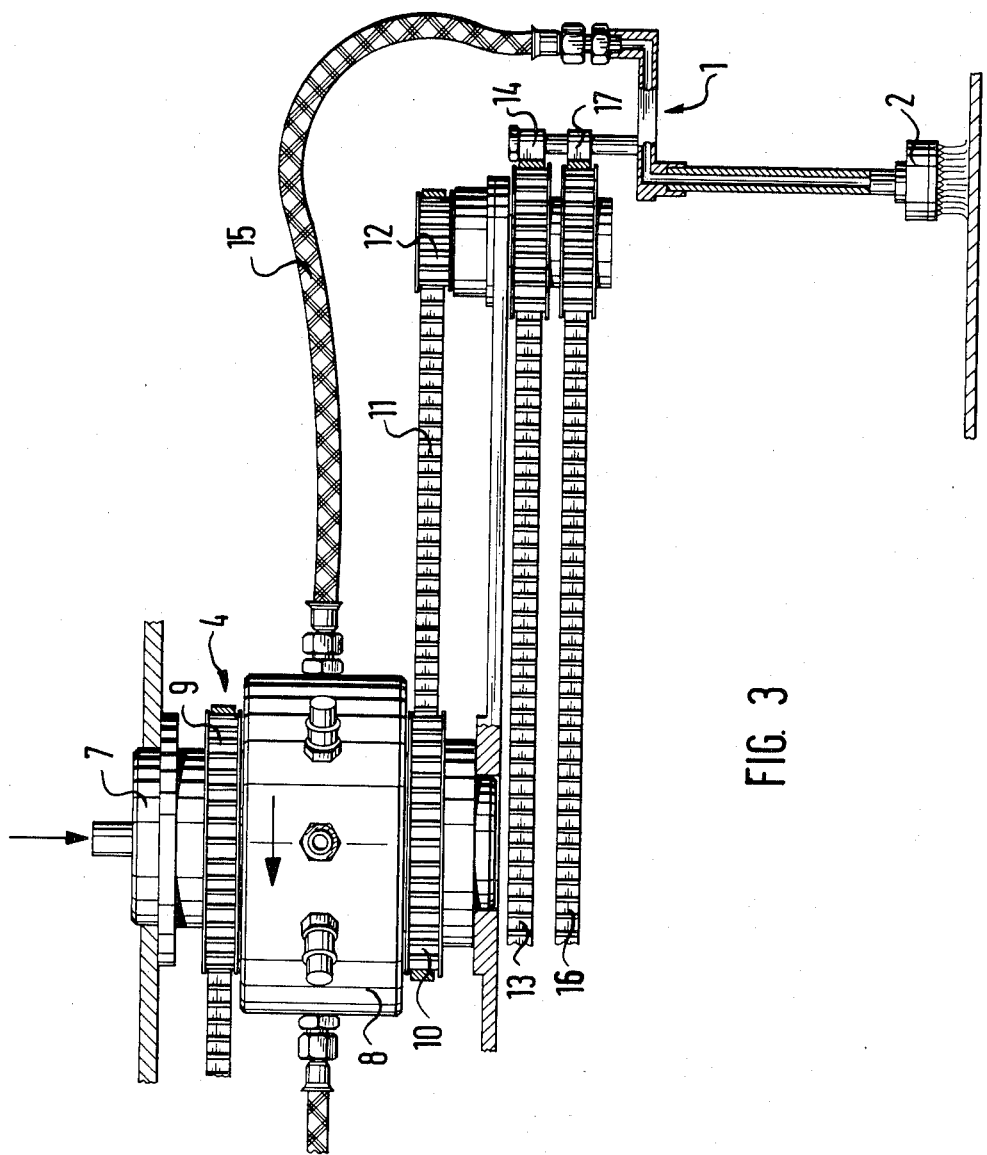
FIG. 3 and FIG. 4 show a side section and a plan view of another embodiment of the invention.
Figure 4:
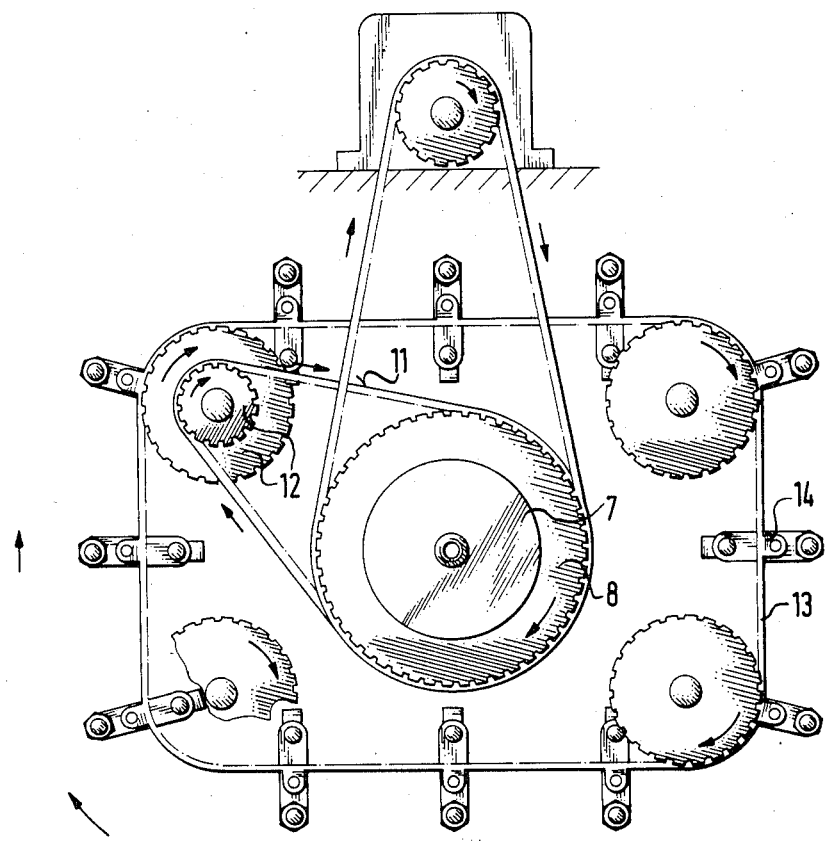

FIGS. 3 and 4 demonstrate another embodiment of the invention. In the embodiment, there is no rail loop 3. Instead, beneath the second toothed belt 13, a third toothed belt 16 runs over the same gear 12 as the second toothed belt 13. This third toothed belt 16 is equipped on its outside with drivers 17 from which the burner units 1 hang.

The device according to the invention for heating an object made of thermoplastic material can be used in a number of ways, depending on the circumstances. The device can be adapted to any arbitrary shape of the object to be heated. The burners can be so fashioned that they act on the object to be heated from above, from the side, or even from below.

What is claimed is:

1. A process for heating an object of thermoplastic material in an elongated zone of predetermined contour, said process comprising:
   providing a closed guidepath extending in correspondence with and in the vicinity of said elongated zone;
   moving a plurality of burners in series along said guidepath synchronously, so as to heat said zone homogeneously, and
   supplying said burners with fuel from a fuel distribution station moved in relation to the movement of said burners.

2. A process according to claim 1, wherein said guidepath comprises straight lines, radii and arcs.

3. A process according to claim 1, wherein said guidepath forms a closed loop.

4. A process according to claim 3, wherein said loop has an asymmetrical contour.

5. A process according to claim 1, wherein said series of burners are moved repeatedly along said guidepath.

6. A process according to claim 3, wherein said series of burners are moved repeatedly along said guidepath.

7. A process according to claim 1, further comprising a rail forming said guidepath for guiding said burners.

8. A process according to claim 1, further comprising entraining said burners from a toothed belt.

9. A process according to claim 1, wherein said zone is the rim area of a glass plate.

10. A device for heating an object of thermoplastic material in an elongated zone of a predetermined contour, said device comprising:
   a closed guidepath extending in correspondence with and in the vicinity of said elongated zone;
   a plurality of burners movable synchronously in series along said guidepath, so as to heat said zone homogeneously; and
   a fuel distribution station, said station including:
      a stator,
      a rotor operatively coupled to said stator, said rotor forming a fuel distribution chamber from which flexible hoses lead to said burners to conduct fuel from said fuel chamber to said burners,
      a first gear for driving said rotor, and a second gear having a toothed belt.

11. A device as in claim 10, wherein said guidepath is a closed loop.

12. A device as in claim 11, wherein said closed loop has an asymmetric contour.

13. A device as in claim 10, wherein said guidepath comprises a rail and said burners include rollers that run on said rail.

14. A device as in claim 10, wherein said guidepath comprises a toothed belt extending over support gears and said burners are entrained from said toothed belt.

15. A device as in claim 10, wherein said fuel distribution station forms a support for said guidepath.

16. A process for heating an object of thermoplastic material in an elongated zone of predetermined contour, said process comprising:
providing a guidepath extending in correspondence with and in the vicinity of said elongated zone; and
moving a plurality of burners in series along said guidepath synchronously, so as to heat said zone homogeneously, said guidepath including
a closed rail loop for guiding said burners, said rail loop being shaped substantially the same as said zone, and
a drive belt means for moving said burners along said closed rail loop.

* * * * *

UNITED STATES PATENT AND TRADEMARK OFFICE
CERTIFICATE OF CORRECTION

PATENT NO. : 4,812,152

DATED : March 14, 1989

INVENTOR(S) : Karl-Heinz JURAS

It is certified that error appears in the above-identified patent and that said Letters Patent is hereby corrected as shown below:

In Column 1, line 63, change "stator 7" to --rotor 8--; and

Signed and Sealed this

Seventh Day of April, 1992

Attest:

HARRY F. MANBECK, JR.

*Attesting Officer*  *Commissioner of Patents and Trademarks*